United States Patent Office 2,743,159
Patented Apr. 24, 1956

2,743,159

RECOVERY OF URANIUM FROM AQUEOUS SOLUTIONS

Garson A. Lutz, Columbus, Ohio, assignor to the United States of America as represented by the United States Atomic Energy Commission No Drawing. Application May 15, 1951,
Serial No. 226,522

16 Claims. (Cl. 23—14.5)

This invention deals with the recovery of uranium from aqueous solutions and in particular with the separation of uranium values from impurities frequently associated therewith, such as iron, aluminum, phosphorous, magnesium, vanadium, titanium, copper, manganese, chromium, calcium, potassium, lanthanum, silicon and strontium values. The process of this invention is particularly valuable for the separation of uranium from shale leach solutions, such as sulfuric acid leach solutions of Chattanooga shale.

In shale leach solutions as they are obtained by dissolving the raw or roasted ores in sulfuric acid, uranium is usually present in low concentrations especially as compared with the concentrations in which the other elements are present from which separation is to be carried out. These other elements will hereinafter be referred to as contaminants or impurities. Analysis of a typical Chattanooga shale showed the following composition:

|   | Percent |
|---|---|
| Uranium | 0.0075 |
| Loss of ignition | 23.0 |
| $SiO_2$ | 49.3 |
| $Al_2O_3$ | 10.71 |
| $TiO_2$ | 0.69 |
| $Fe_2O_3$ | 9.6 |
| CaO | 0.36 |
| MgO | 1.22 |
| $K_2O$ | 4.03 |
| $Na_2O$ | 0.33 |
| $CO_2$ | 0.31 |
| $P_2O_5$ | 0.12 |
| S | 6.9 |
| C | 14.3 |
| H | 1.55 |

Great difficulty was encountered when conventional methods were used in quantitatively recovering and separating uranium from the contaminants.

It is an object of this invention to provide a process for the separation of uranium from aqueous solutions in which the uranium is present in very low concentrations, actually as well as relatively with regard to contaminants.

It is another object of this invention to provide a process for recovering uranium from highly dilute solutions in the form of relatively concentrated solutions so that further processing of these concentrated solutions obtained is then possible by conventional methods.

It is another object of this invention to provide a process for the practically quantitative recovery of uranium from very dilute aqueous solutions.

It is finally another object of this invention to provide a process for recovering uranium from leach solutions of concentrated uranium-bearing shale.

It has been found that from sulfuric acid solutions containing uranium and one or several of the contaminants listed above, when contacted with an anion exchange resin, the uranium values are preferentially absorbed while the contaminants preferentially remain in the effluent.

The process of this invention consequently comprises acidifying uranium(VI)-containing aqueous solutions, such as the aforementioned shale leach solutions, with sulfuric acid, guiding these solutions over, or otherwise contacting them with, an anion exchange resin whereby the uranyl values are preferentially adsorbed on said resin while contaminants remain in the solution, and separating the resin from the solution.

All of the contaminants listed above are adsorbed by the resin to a considerably lesser degree, or not at all, so that the process is operative in all of these cases. Phosphate anions are often coadsorbed with the uranium; however, they may be easily separated therefrom by selectively eluting the phosphate prior to elution of the uranium as will be shown later.

The only element which cannot be easily separated by the process of this invention and which is adsorbed together with the uranium to an essential degree is molybdenum. However, separation of uranium from molybdenum may be carried out by methods known to those skilled in the art without difficulty. One method for the separation of uranium from molybdenum, for instance, forms the subject matter of the assignee's copending application Serial No. 231,263, filed June 12, 1951, by Archie E. Ruehle.

All anion exchange resins were found suitable for the process of this invention. Particularly good results, though, were obtained with amine type resins such as these shown in Table I.

TABLE I

| Trademark | Type of Resin |
|---|---|
| Amberlite IR-4B | Modified phenol formaldehyde polyamine condensate (weak base). |
| Amberlite IRA-400 | Quaternary amine-type monofunctional in nature (strong base). |
| De-Acidite | Aliphatic amine-type (weak base). |
| Dowex-1 | Quaternary amine-type. |
| Dowex-2 | Do. |
| Duolite A-2 | Phenol formaldehyde tertiary amine. |
| Ionac A-293M | Melamine-guanidine-formaldehyde resin. |
| Ionac A-300 | Amine-type resin (intermediate base). |

Ionac A–300 yielded the very best results.

Ionac A–300 is an intermediate base amine-type resin made according to the example showing the preparation of resin "A" in U. S. Patent No. 2,515,142.

The adsorptive capacity of the resins for uranium varied greatly with the different conditions, the type of resin, etc. A capacity up to about 40% (40 g. uranium per 100 g. of resin) was ascertained. The concentration of sulfuric acid was found to have no effect on the adsorptive capacity, and a sulfuric acid concentration ranging from 0.1 to 20% was found suitable; a concentration of from 0.5 to 10%, however, was preferred.

The resins are usually obtained from the manufacturer as the chloride salt and contain from about 40 to 55% moisture; their particle size ranges from 20 to 80 mesh. It was found advisable first to dry the resins in air at room temperature whereby the water content is reduced to approximately 10%. The resins are then advantageously treated with a dilute sodium hydroxide solution, for instance, with 10 ml. of a 4% sodium hydroxide solution per one gram of resin for thirty minutes. The resin is then filtered from the solution and washed with water until the effluent is neutral. Finally, the resin is "conditioned" by treating it with a dilute sulfuric acid or sulfate solutions, e. g., a 4% sulfuric acid solution. Instead of this treatment, however, washing of the resin with a 10% sulfuric acid solution alone until the effluent is acid was found also to be completely satisfactory.

The process yielded very good results even with solutions having a uranium concentration of as low as 20 mg. uranium per liter of solution.

The uranium values adsorbed by the resin, after separation of the resin from the solution, may be recovered by elution. For this purpose mineral acid, in particular hydrochloric acid and nitric acid, aqueous solutions of mineral acid salts, such as ammonium nitrate, sodium chloride and sodium nitrate, and also a solution containing approximately 1 N sodium hydroxide plus 1% hydrogen peroxide, proved suitable. While nitric acid was found satisfactory in a concentration up to 5 N, hydrochloric acid was less efficient at these higher concentrations, and concentrations of 1 N and 2.5 N hydrochloric acid, for instance, were preferred. However, elution of the adsorbed uranium values by first using a 5 N hydrochloric acid followed by 2.5 N hydrochloric acid yielded excellent results. In some cases, elution with hydrochloric acid was combined with an after-elution with the above-mentioned sodium hydroxide-hydrogen peroxide mixture; while no significant improvement was found for most contaminants by this two-step elution over that with hydrochloric acid alone, the use of a caustic eluant was found beneficial for the complete removal of silicon from the resin, if present.

As has been mentioned above, phosphate anions retained by the resin are preferentially eluted together with the other impurities that might have been retained. After the elution of the phosphate and other contaminants, the uranium is quantitatively eluted. In some instances the eluate obtained from the resin had a uranium concentration of as high as about 5 g./liter and was free from any extraneous metals with the exception of molybdenum.

In the following a number of examples are given which illustrate the efficiency of the process of the invention. The details given in these examples are not intended to limit the scope of the invention.

*Example I*

"Synthetic" leach solutions were prepared which contained uranyl salt, a ferrous salt and sulfuric acid in varying concentrations. The solutions each were passed over 35 g. of Amberlite IRA-400 (conditioned with 30 ml. of 2.5 N sodium hydroxide and arranged in a 7-inch high column). Four hundred cc. of each solution contained 5 mg. of uranyl values; the contact time of the solutions with the resin was ninety minutes.

The experiments of this example were carried out with three groups of solutions, namely, with solutions containing 0.1%, 1.0% and 2.0% sulfuric acid, respectively; each group consisted of four samples each having a different mole ratio of ferrous ion to uranyl ion, namely, 1:1, 10:1, 100:1 and 300:1, respectively. The removal of uranium by the resin from these twelve individual solutions in each case was 99% of the uranium originally present in the solution. The effluents in each instance showed considerable quantities of iron (a quantitative determination was not made in these experiments).

*Example II*

Eighteen liters of an actual roasted-shale leach solution were passed through a column having a diameter of 2 cm. and containing 50 g. of a quaternary amine-type resin. The pH of the leach solution was 1.2 and the flow rate was 1200 ml./hr. The resin had been conditioned by agitating it in 500 ml. of 4% sodium hydroxide for thirty minutes followed by treatment with 500 ml. of 5% sulfuric acid, then slurrying it into the exchange column and rinsing with 1000 ml. of 0.5% sulfuric acid.

After adsorption, the resin was treated, for elution, with 500 ml. of a 2.5 N hydrochloric acid followed by 500 ml. of a 1 N sodium hydroxide solution which contained 1% of hydrogen peroxide. The results of these tests as well as the composition of the original leach solution are given in Table II.

TABLE II

| Composition of Leach Solution | | Ions in Eluates, mg. | | | Removal from Solution, Percent |
|---|---|---|---|---|---|
| Ion | Total mg. | Acid | Caustic | Total | |
| U | 1,386 | 858 | 81 | 939 | 68 |
| Al | 90,000 | Trace | Trace | Trace | Trace |
| Fe+2 | 34,000 | | | | |
| Fe+3 | 36,000 | | | | |
| Total Fe | 70,000 | 70 | 6 | 76 | 0.11 |
| P | 27,500 | 122 | 0 | 122 | 0.44 |

This example shows that aluminum, iron and phosphate values were practically unadsorbed by the resin; it also shows that the second elution step with sodium hydroxide and hydrogen peroxide does not have a considerable improving effect on the total result. The uranium recovery in this example was 68%. However, a nearly quantitative removal of the uranium may be obtained by using a series of columns. This is shown in the following example.

*Example III*

Twenty liters of a roasted-shale leach solution was passed through four resin columns each having a diameter of 1 cm. and consisting of 10 g. of Ionac A-300. The resin had been conditioned with 125 ml./10 g. resin of a 4% solution of sodium hydroxide followed by the same quantity of a 5% solution of sulfuric acid, and, after slurrying into the columns, the resin was rinsed with 250 ml. of 0.5% sulfuric acid per 10 g. of resin.

The columns were arranged in series whereby a maximum uranium concentration was made possible on the first column without greatly affecting over-all efficiency, since the succeeding columns captured the uranium escaping the first column. The flow rate of the leach solution was 500 ml./hr.; its pH was 1.3. The four columns, after adsorption, were eluted individually, each first with 100 ml. of water, then with 50 ml. of 5 N hydrochloric acid followed by 250 ml. of 2.5 N hydrochloric acid at a flow rate of 250 ml./hr. The results are summarized in Table III.

TABLE III

ELUTED FROM COLUMNS, MG.

| Column No. | U | P | Mo | Al | Fe |
|---|---|---|---|---|---|
| 1 | 304 | 160 | 130.0 | 6.0 | 5.1 |
| 2 | 280 | 145 | 52.5 | 5.0 | 9.0 |
| 3 | 194 | 129 | 26.0 | 5.0 | 12.3 |
| 4 | 90 | 125 | 17.5 | 11.0 | 13.0 |
| Total | 868 | 559 | 226.0 | 27.0 | 39.4 |

REMAINING ON RESIN, MG.

| | U | P | Mo | Al | Fe |
|---|---|---|---|---|---|
| 1 | 15.7 | 3.7 | 13.5 | 16.0 | 1.1 |
| 2 | 12.2 | 4.8 | 8.5 | 6.0 | 2.2 |
| 3 | 12.8 | 2.8 | 7.4 | 6.0 | 2.9 |
| 4 | 5.0 | 1.9 | 5.3 | 6.0 | 2.6 |
| Total | 45.7 | 13.2 | 34.7 | 34.0 | 8.8 |
| Total removed, mg | 914 | 572 | 261 | 61 | 48.2 |
| Content in leach soln., mg./liter | 45 | 1,330 | 25 | 2,230 | 4,760 |
| Removal, percent | [1] 95 | [2] 2.1 | [2] 52 | [2] 0.13 | [2] 0.05 |

[1] Percent removal of uranium based on eluate analysis and total metal found. Effluent leach solution contained 48 mg.; total uranium found was 962 mg.
[2] Percent removal based on analysis of eluate and head solution analysis.

The over-all removal of uranium was approximately 95% on the basis of total uranium accounted for. Removal of iron and of aluminum from the solution was again negligible. Phosphorus was removed to the extent of 2% and was present in the eluates in appreciable quantities. Removal of molybdenum was high showing that it was coadsorbed with the uranium to a considerable degree.

The resin in the columns was ignited after the elution step and the ash was analyzed for the various components. The analysis indicated that 5% of the adsorbed uranium had not been eluted by the hydrochloric acid treatment.

This example shows that considerable quantities of phosphate are adsorbed by the resin although most of it leaves the column in the effluent. This adsorbed phosphate, however, is easily eluted; in fact, the phosphate is preferentially eluted as is obvious from Example IV in which various fractions of eluant were individually analyzed.

*Example IV*

The same type of leach solution having the same concentrations as in Example III was used for this experiment. Twenty liters of the leach solution were passed through four 10-gram columns (1 cm. diameter) of Amberlite IR–4B arranged in series at a flow rate of 500 ml./hr. The resin had been conditioned as described in the previous examples. After adsorption the columns were washed with 100 ml. of water and then eluted with 350 ml. of a 2.5 N hydrochloric acid at a flow rate of 250 ml./hr. employing series flow. Fifty-ml. cuts of the 450-ml. eluate were taken individually and analyzed for uranium and phosphorus. The analysis of the various fractions is given in Table IV.

TABLE IV

| Eluate Fraction (50 ml.) | Mg. per 50 ml. of Eluate | |
|---|---|---|
| | uranium | phosphorus |
| 1 | 1.1 | not detected |
| 2 | 0.8 | 61 |
| 3 | 2.2 | 141 |
| 4 | 11 | 130 |
| 5 | 30 | 44 |
| 6 | 60 | 12 |
| 7 | 225 | 2.2 |
| 8 | 258 | 1.3 |
| 9 | 34 | 0.5 |
| Total | 622 | 392 |
| Removal, percent | 68 | 1.46 |

It will be seen that the last four fractions of the eluate contained 93% of the eluted uranium but only 4% of the phosphate eluted from the resin. Similarly, the last three fractions contained 83% of the uranium and only 1% of the phosphate. The greatest part of the phosphorus was contained in the first four fractions. The seventh and eighth fractions contained a total of 483 mg. of uranium in only 100 ml. of solution, a concentration of nearly 5 g. of uranium per liter.

*Example V*

Another test was conducted in a semicontinuous manner as it is used in commercial ion exchange practice. Ionac A–300, conditioned only by treating with 10% sulfuric acid until the effluent was acid, was used in this experiment. Three 5-gram columns of the resin arranged in series, had leach solution passed through them in two- or three-liter batches at a flow rate of approximately 500 ml./hr. The first column, when nearly saturated with respect to uranium, was removed from the system, stripped and returned to the system as the third column. Elution was carried out first with one 50-ml. portion of water followed by successive 50-ml. portions of 2.5 N hydrochloric acid at a flow rate of 50 ml./hr. The hydrochloric acid eluates were collected in 50-ml. fractions. These were re-used, in sequence, to elute the next column to be stripped. After carrying the test through eight cycles, the eluate fractions were analyzed chemically for the uranium and furthermore given a semiquantitative spectrographic analysis for uranium and contaminants. A total of twenty-two liters of leach solution was passed through these columns in the eight cycles. The results are given in Table V.

TABLE V

| | Concentrations in Various Solutions | | | | | | | |
|---|---|---|---|---|---|---|---|---|
| Original leach solution, mg./liter | U* | U** | Fe | Al | P | Si | Mo | V |
| | 45 | | 4,760 (Fe++:3450) (Fe+++:1310) | 2,230 | 1,330 | 380 | 25 | 64 |
| | Mg./50 ml. | p. p. m. | p. p. m. | p. p. m. | p. p. m. | p. p. m. | p. p. m. | p. p. m. |
| Eluate 1 (H2O) | 0.5 | not detected | 100–1,000 | 1,000–10,000 | 20–200 | 20–200 | trace | 5–50. |
| Eluate 2 (HCl) | 0.5 | do | 100–1,000 | 1,000–10,000 | 20–200 | 20–200 | 1–5 | 5–50. |
| Eluate 3 (HCl) | 2.3 | do | 500–5,000 | 1,000–10,000 | 200–2,000 | 20–200 | 2–20 | 5–50. |
| Eluate 4 (HCl) | 8.6 | 50–500 | 200–2,000 | 500–5,000 | 200–2,000 | 10–100 | 5–50 | 2–20. |
| Eluate 5 (HCl) | 12.4 | 50–500 | 50–500 | 100–1,000 | 200–2,000 | 10–100 | 5–50 | 0.5–5. |
| Eluate 6 (HCl) | 21.5 | 100–1,000 | 50–500 | 50–500 | 50–500 | 10–100 | 10–100 | 0.5–5. |
| Eluate 7 (HCl) | 40.5 | 500–5,000 | 10–100 | 20–200 | 20–200 | 5–50 | 20–200 | not detected. |
| Eluate 8 (HCl) | 104 | 500–5,000 | 10–100 | 20–200 | trace | 2–20 | 20–200 | Do. |
| Eluate 9 (HCl) | 155 | 500–5,000 | 5–50 | 10–100 | do | 2–20 | 20–200 | Do. |
| Eluate 10 (HCl) | 130 | 500–5,000 | 2–20 | 5–50 | do | 2–20 | 20–200 | Do. |
| Eluate 11 (HCl) | 80 | 500–5,000 | 2–20 | 10–100 | not detected | trace | 20–200 | Do. |
| Eluate 12 (HCl) | 70 | 500–5,000 | 2–20 | 10–100 | do | do | 20–200 | Do. |

*Determined by chemical analysis.
**Determined by spectrographic analysis.

Uranium elution was not completed after the twelve elution steps, and introduction of hydrochloric acid was therefore continued. A total of 824 mg. of uranium was eluted from the three columns which represents an overall removal of 83%.

The table also shows that again the phosphate and iron were preferentially eluted and that molybdenum was concurrently eluted with the uranium. Other elements also present but not shown in the table, such as potassium, magnesium, calcium, chromium, strontium, titanium, manganese and lanthanum were also concentrated in the first fractions of eluant where the uranium elution was still slight. This experiment proves that good separations may be accomplished by the process of this invention.

The eluate fractions 8 through 12 of this test were combined and precipitated with ammonia. Ignition of the precipitate produced a concentrate the analysis of which showed 79% of $U_3O_8$; this represents nearly 90% of the uranium eluted from the resin. The principal contaminant was found to be molybdenum on the basis of spectrographic analysis.

In the following example the application of the process of this invention on a large scale basis is illustrated.

*Example VI*

Approximately 560 lb. of kiln-roasted shale was leached in 2% sulfuric acid using two two-stage leaches. The leach solutions obtained and washings were passed through a column 1 13/16" x 35" which was filled with Ionac A–300. The flow rate was 8 liters/hr., which was slow enough to avoid channeling in the bed. The uranium removal in this experiment was found to be 80%, and the final effluent contained an average of 4.8 mg. uranium per liter. Selective elution of the column permitted the production of a precipitate which contained 54% $U_3O_8$ (ignited basis) and which represented 90% of the uranium removed from the solution.

It has been mentioned before that the acid concentration has no effect on the uranium adsorption by the resin. It was also found that the concentration of the elements or contaminants associated with the uranium, even when present in relatively high concentrations, did not impair the efficiency of the process. In all of the above examples (except Example I), the solutions used had been obtained by leaching the roasted ores; they all had a relatively low acid concentration.

The uranium recovery for raw unroasted-shale leach solutions which normally have a considerably higher sulfuric acid content between 5 and 10% as compared with about 1% sulfuric acid in the roasted-shale leach solutions) was also investigated. The results of these tests were just as good as with the roasted-shale leach solutions and the adsorptive capacity of the resin was not impaired at all be repeated (e. g. fourteen times in one instance) recycling and re-use. These experiments also illustrated that the relative pick-ups of the various elements from raw-shale solutions were not any different from those of the roasted-shale solutions. This represents an essential advantage over other processes which require roasting of the shale.

It will be understood to anybody skilled in the art that recycling of the solutions improves the efficiency of the process. The process may be carried out as a discontinuous batch process or as a semicontinuous process by using a plurality of columns one of which at least is in the stage of adsorption while another one is in that of desorption.

It will also be understood that this invention is not to be limited to the details given herein but that it may be modified within the scope of the appended claims.

What is claimed is:

1. A process of separating uranyl values from aqueous sulfuric acid solutions containing impurities usually associated with uranium and selected from the group consisting of iron, aluminum, phosphorus, magnesium, vanadium, titanium, copper, manganese, chromium, calcium, potassium, lanthanum, silicon and strontium, comprising thoroughly contacting said solution with an anion exchange resin whereby uranyl values are preferentially and some of the contaminants partially adsorbed, treating said resin with an aqueous mineral acid anion-containing solution for the elution of adsorbed values whereby said adsorbed contaminants and said uranium contaminants are fractionally and selectively eluted and with a hydrogen peroxide-containing solution of sodium hydroxide whereby adsorbed silicon is removed from said resin, and collecting the eluted solutions in fractions.

2. The process of claim 1 wherein said sodium hydroxide solution contains 1 N sodium hydroxide and 1% hydrogen peroxide.

3. The process of separating uranyl values from aqueous sulfuric acid solutions, comprising thoroughly contacting said solutions with an anion exchange resin whereby uranyl values are adsorbed on said resin, separating said resin from said solutions, and eluting the adsorbed uranium values from said resin by means of aqueous solutions contained mineral acid anions selected from the group consisting of nitrate and chloride anions.

4. A process of separating uranyl values from aqueous sulfuric acid solutions containing impurities usually associated with uranium and selected from the group consisting of iron, aluminum, phosphorus, magnesium, vanadium, titanium, copper, manganese, chromium, calcium, potassium, lanthanum, silicon and strontium, comprising thoroughly contacting said solutions with an anion exchange resin whereby uranyl values are preferentially adsorbed on said resin, separating said resin from the solution, and treating said resin with an aqueous mineral acid anion-containing solution for the elution of the adsorbed values.

5. A process of separating uranyl values from aqueous sulfuric acid solutions containing impurities usually associated with uranium and selected from the group consisting of iron, aluminum, phosphorus, magnesium, vanadium, titanium, copper, manganese, chromium, calcium, potassium, lanthanum, silicon and strontium, comprising thoroughly contacting said solution with an anion exchange resin whereby uranyl values are preferentially and some of the contaminants partly adsorbed, treating said resin with an aqueous mineral acid anion-containing solution as an eluant for the adsorbed values whereby said adsorbed contaminants and said uranium contaminants are fractionally and selectively eluted, and collecting the eluted solution in fractions.

6. The process of claim 5 wherein the resin is an amine-type resin.

7. The process of claim 6 wherein the resin is a quaternary amine-type resin.

8. The process of claim 5 wherein the concentration of sulfuric acid in the solution to be treated with the resin ranges from 0.1 to 20%.

9. The process of claim 8 wherein the concentration of sulfuric acid ranges from 0.5 to 10%.

10. The process of claim 5 wherein the eluant is mineral acid.

11. The process of claim 10 wherein the mineral acid is hydrochloric acid.

12. The process of claim 11 wherein the hydrochloric acid has a concentration of up to 3 N.

13. The process of claim 5 wherein the eluant is nitric acid.

14. The process of claim 13 wherein the nitric acid has a concentration of up to 5 N.

15. The process of claim 5 wherein the eluant is an aqueous solution of a mineral acid salt.

16. A process of separating uranyl values from aqueous sulfuric acid solutions containing said uranyl values together with vanadium values, comprising thoroughly contacting said solutions with an anion exchange resin whereby uranyl values are preferentially adsorbed on said resin, separating said resin from the solution containing said vanadium values, and treating said resin with an aqueous mineral acid anion-containing solution for the elution of said uranyl values.

References Cited in the file of this patent

FOREIGN PATENTS 626,882    Great Britain _____ July 22, 1949

OTHER REFERENCES

Russell et al.: Journal of the American Chemical Society, vol. 65. pp. 595–600 (1943).

Sussman et al.: Industrial & Engineering Chemistry, vol. 37, pp. 618–624 (1945).

Tompkins et al.: Journal of the American Chemical Society, vol. 69, pp. 2769–2777 (1947).

Betts et al.: Journal of the Chemical Soc. (1949), part V, pp. S286–S294.

Arden: Journal of the Chem. Soc. (1949), part V, p. S299.

Sutton: The Hydrolysis of the Uranyl Ion, Chem. Abs., vol. 44, p. 8746 (1950).

Arden: The Formation of Complex Ions in Uranyl Sulfate Solution, Chem. Abs., vol. 44, p. 8746 (1950).